US006737098B1

(12) United States Patent
Devine et al.

(10) Patent No.: US 6,737,098 B1
(45) Date of Patent: May 18, 2004

(54) THERMOREVERSIBLE FOOD PRODUCT

(75) Inventors: Elizabeth Devine, Derry (IE); Conor Ward, Derry (IE)

(73) Assignee: Saint Brendan's Irish Cream Liqueur Company Limited, Londonderry ( * ) Notice: Subject to any disclaimer, the term of this patent is extended or adjusted under 35 U.S.C. 154(b) by 0 days.

(21) Appl. No.: 09/856,445

(22) PCT Filed: Nov. 22, 1999

(86) PCT No.: PCT/EP99/09146

§ 371 (c)(1),
(2), (4) Date: Aug. 17, 2001

(87) PCT Pub. No.: WO00/30470

PCT Pub. Date: Jun. 2, 2000

(30) Foreign Application Priority Data

Nov. 21, 1998 (GB) ............................................. 9825446

(51) Int. Cl.⁷ ........................... A23L 2/00; A23L 1/053; A23L 1/0532
(52) U.S. Cl. ...................... 426/576; 426/575; 426/578; 426/592; 426/593
(58) Field of Search ................. 426/576, 575, 426/578, 592, 593

(56) References Cited

U.S. PATENT DOCUMENTS

| 3,969,536 A | * | 7/1976 | Ikeda et al. ................. 426/103 |
| 4,419,378 A | | 12/1983 | Rule ........................... 426/552 |
| 5,417,990 A | * | 5/1995 | Soedjak et al. ................ 426/89 |
| 6,048,567 A | * | 4/2000 | Villagran et al. ............. 426/594 |
| 6,174,557 B1 | * | 1/2001 | Gamez-Rumpf et al. ... 426/594 |
| 6,228,415 B1 | * | 5/2001 | Jimenez-Laguna et al. . 426/565 |
| 6,294,213 B1 | * | 9/2001 | Hashisaka et al. .......... 426/249 |
| 6,403,140 B1 | * | 6/2002 | Tiainen et al. .............. 426/576 |
| 6,458,404 B1 | * | 10/2002 | Adachi ........................ 426/573 |
| 6,531,169 B2 | * | 3/2003 | Best et al. ..................... 426/91 |
| 6,534,108 B2 | * | 3/2003 | Jimenez-Laguna et al. . 426/565 |

FOREIGN PATENT DOCUMENTS

GB 2 211 393 A 5/1989

OTHER PUBLICATIONS

International Search Report for International Publication No. WO 00/30470 Published on Jun. 2, 2000 May 4, 2000.
International Preliminary Examination Report for International Application No. PCT/EP99/09146, Jul. 7, 2000.

* cited by examiner

Primary Examiner—N. Bhat
(74) Attorney, Agent, or Firm—Van Dyke, Gardner, Linn & Burkhart, LLP

(57) ABSTRACT

The present invention concerns a beverage food product. The beverage food product is in a gel phase at room temperature and is converted to a liquid phase at a temperature elevated above room temperature. The invention has a particular application to a bi- or multi-layered beverage food product, in particular a cream liqueur. The invention provides a beverage food product whose top layer comprises less than 70% (w/w) water. This overcomes a prior art problem of color migration between layers.

20 Claims, No Drawings

THERMOREVERSIBLE FOOD PRODUCT

CROSS REFERENCE TO RELATED APPLICATION

This application claims the benefit under 35 U.S.C. 371 of PCT/EP99/09146, filed on Nov. 22, 1999.

The present invention concerns a thermoreversible food product.

The term "thermoreversible" is intended to mean that which is convertible from a gel phase at room temperature to a liquid phase at a temperature elevated above room temperature. The term "thermoreversible" also includes the preferred term "thermointerchangeable" as that which is convertible from a gel phase at room temperature to a liquid phase at a temperature elevated above room temperature and is reconvertible back to a gel phase when cooled to room temperature.

It is an object of the present invention to provide a food product which is gelled at room temperature and which, following heating in a microwave, has completely melted.

It is a further object of the present invention to provide a bilayered food product in which both layers are gelled at room temperature and in which, following heating in a microwave, both layers are completely melted, but remain as substantially separate liquid layers.

It is a still further object of the present invention to provide a bilayered food product in which colour migration between the two layers is substantially eliminated, after the food product has been microwaved.

It is also an object of the present invention to provide a multilayered food product, in which all layers are gelled at room temperature and in which, following heating in a microwave, at least two of the layers are completely melted, but remain substantially separate liquid layers, and in which colour migration, between those layers, is substantially eliminated.

The food product may be, for example, a coffee liqueur product, having a base layer containing coffee and alcohol and having a top layer containing an animal fat or a mixture thereof, a vegetable fat or a mixture thereof or a mixture of animal and vegetable fats. It is envisaged that both layers of such a food product may be melted to their respective liquid phases and heated by means of a microwave.

In a first embodiment, the invention provides a food product having a top layer comprising less than 70%, preferably less than 65%, more preferably less than 60%, most preferably less than 50%, (w/w) water and an amount of at least one top thermoreversible setting agent sufficient to maintain the top layer in a gel phase at room temperature whilst permitting thermoreversion to a liquid phase at a temperature elevated above room temperature, with the proviso that sodium caseinate is substantially absent.

Preferably, the top layer contains 40–65% (w/w) water, more preferably 40–50% (w/w) water.

More preferably, the top layer contains at least 40% (w/w) water.

By "room temperature", we mean at or below 23° C. By "temperature elevated above room temperature", we mean that the temperature in the relevant layer is, following heating by microwave, at or above 40° C., preferably at or above 45° C., more preferably at or above 50° C., most preferably at or above 55° C.

Preferably, the food product additionally includes a base layer comprising at least one base thermoreversible setting agent in an amount sufficient to maintain the base layer in a gel phase at room temperature, whilst permitting thermoreversion to a liquid phase at a temperature elevated above room temperature.

Advantageously, the top layer additionally comprises at least one top emulsifier and more than 15% (w/w) fat. More advantageously, the top layer contains more than 20% (w/w) fat and most advantageously 20–40% (w/w) fat. The fat can be of animal or vegetable origin, or a mixture thereof.

Preferably, the at least one top thermoreversible setting agent is combined with the at least one top emulsifier selected from at least one mono-glyceride of a fatty acid or mixtures thereof; at least one di-glyceride of a fatty acid or mixtures thereof; at least one sucrose ester or mixtures thereof; or mixtures of two or more of mono-glycerides, di-glycerides and sucrose esters. More preferably, the top layer contains 0.1 to 1.75% (w/w) of the at least one top thermoreversible setting agent. Even more preferably, the base layer contains 0.1 to 3.5% (w/w) of the at least one base thermoreversible setting agent.

In a conventional cream liqueur system, sodium caseinate is used as an emulsifier and as a stabiliser. However, in a microwavable food product, which is the subject of the present invention, the co-presence of sodium caseinate and alcohol causes skin formation when the food product is microwaved. It was, therefore, necessary to preclude the use of sodium caseinate.

It is believed that the present invention overcomes the problem of colour migration by providing a top layer having less than 70% (w/w) water—this reduces hydrogen ion migration, which is accompanied by colour migration, from the base layer to the top layer, which hydrogen ion migration affects the pH of the top layer and may also be accompanied by a breakdown in the stability of the top layer's emulsion, causing it to lose its thermoreversibility.

Suitable emulsifiers should not form a skin on the upper surface of the top layer when the top layer is heated—it is thought that such skin formation is related to denaturation of a proteinaceous emulsifier, so that such emulsifiers should be avoided. Suitable emulsifiers must be comestible and include, but are not limited to, mono-glycerides of fatty acids, di-glycerides of fatty acids, sucrose esters or mixtures thereof. Sucrose esters endow good stability, but their organoleptic properties need to be improved.

Suitable top and base thermoreversible setting agents must be comestible and include, but are not limited to, gelatine, agar, gellan gum, methyl celluloses, guar gum, carrageenan (preferably kappa and/or iota carrageenan), gum arabic, xanthan gum, locust bean gum or mixtures thereof. When the thermoreversible setting agent is gelatine, the top layer may contain 0.75 to 1.75% (w/w), more preferably 1.0 to 1.5% (w/w) gelatine and the base layer may contain 1.5 to 3.5% (w/w), preferably 2.0 to 3.25% (w/w), more preferably 2.25 to 2.75% (w/w) gelatine. When the thermoreversible setting agent is carrageenan, the top layer may contain 0.1 to 1.0% (w/w), preferably 0.25 to 0.75% (w/w) carrageenan and the base layer may contain 0.1 to 1.5% (w/w), preferably 0.2 to 0.75% (w/w) carrageenan. If a mixture of carrageenans is used, they may be present in a ratio of 2:1 to 1:2, preferably 1.5:1 to 1:1.5 (ratio of kappa to iota carrageenan).

Gelatine is obtained from collagen found in animal tissues, including the skin, tendons and ossein of bones.

In a second embodiment, the invention provides a cream liqueur food product having a top layer comprising (i) less than 70% (w/w) water; (ii) more than 15% (w/w) fat; (iii) at least one top emulsifier; and (iv) at least one top thermoreversible setting agent, the at least one top emulsifier and the at least one thermoreversible setting agent being sufficient to maintain the top layer in a gel phase at room temperature, whilst permitting thermoreversion to a liquid phase at a temperature elevated above room temperature, with the proviso that the, or each, top emulsifier or setting agent is not sodium caseinate.

The invention also provides a method for forming a layer of a food product, comprising at least one thermoreversible setting agent and/or at least one emulsifier, the method comprising the steps of providing a first liquid phase at a temperature below room temperature; providing a second liquid phase comprising an amount of at least one setting agent and/or at least one emulsifier sufficient to maintain a mixture of the first and second liquid phases, when mixed in a thermoreversible gel phase at room temperature with the proviso that the, or each, setting agent and/or emulsifier is not sodium caseinate, the second liquid phase being at a temperature raised above room temperature; and mixing the first and second liquid phases to obtain the top layer.

By "raised temperature" is meant a temperature at or above 30° C., preferably at or above 35° C.

It will be appreciated that, if the food product comprises a top layer and a base layer, the aforementioned method comprises the steps of providing first and second base phases; mixing the first and second base phases and allowing the thus mixed first and second base phases to set; providing first and second top phases; mixing the first and second top phases and allowing the thus mixed first and second top phases to set on the base layer.

According to a further embodiment of the invention there is provided a method for forming a layer of a food product comprising at least one thermoreversible setting agent and/ or at least one emulsifier sufficient to maintain the layer in a gel phase with the proviso that the, or each, setting agent and/or emulsifier is not sodium caseinate.

It will be appreciated that, if the food product comprises a top layer and a base layer, the aforementioned method comprises the steps of providing the first layer, allowing the first layer to set; providing the second layer and allowing the second layer to set on the base layer.

Advantageously, the food product is a cream liqueur. By "cream liqueur" is meant a bi- or multi-layered beverage whose top layer contains fat of animal and/or vegetable origin and at least one of whose other layers contains alcohol. If the cream liqueur is bilayered, the volume ratios of the top and base layer should be in the range 1:1 to 1:12, preferably 1:1 to 1:10, most preferably about 1:2. Hereinafter is exemplified a cream liqueur food product in the form of an "Irish Coffee" having two layers, namely a base layer and the top layer. It will, of course, be appreciated that the cream liqueur food product may, alternatively, be a "French Coffee" if brandy is added instead of Irish whiskey in the base layer. Similarly, a "Russian Coffee" (vodka) or "Caribbean Coffee" (rum), etc., are also envisaged. The present invention is not of course limited to coffee-containing cream liqueur food products (coffee cream liqueur food products)

Any comestibly suitable alcohol in the base and/or top layer may be selected from spirits, such as neutral spirit, whiskey, whisky, brandy, vodka, rum or a mixture thereof. Preferably, the base layer contains 7 to 20% (w/w), preferably 8 to 12.5% (w/w), more preferably 8.75 to 10% (w/w) alcohol. More preferably, the top layer contains 7 to 20% (w/w), preferably 8 to 12.5% (w/w), more preferably 8.75 to 10% (w/w) alcohol. Advantageously, the cream liqueur food product contains 7 to 20% (w/w), most preferably 8.75 to 10.5% (w/w) alcohol.

The invention will now be described and exemplified in the following examples, which are not intended to limit the scope of the invention.

EXAMPLE 1

A gelatine-containing cream liqueur food product is prepared in the following manner.

The base layer is made first and needs to set before the top layer is applied. In this example, the base layer is made by forming first and second liquid base phases, the first liquid base phase being a coffee flavoured solution and the second liquid base phase being a 7.5% (w/w) gelatine solution.

Table 1 shows the ingredient list for the base and top layers of two formulations of the present invention—Formulations A and B—each of which is similarly prepared.

TABLE 1

BASE LAYER - INGREDIENT LIST

| Ingredients | A % (w/w) | B % (w/w) |
|---|---|---|
| Water | 72.34 | 72.14 |
| Sugar | 15.00 | 15.00 |
| Gelatine-Sherex*** | 2.45 | 2.45 |
| Caramel (Quest 15752) | 0.49 | 0.49 |
| Neutral Spirit | 7.64 | 7.75 |
| Whiskey | 1.13 | 1.13 |
| Flavour | 0.39* | 0.49** |
| 4% NaOH Solution | 0.55 | 0.55 |

*Coffee (Quest 2A92529)
**Coffee QL 15052
***Sherex is a 240-bloom pork gelatine supplied by Quest International.

TOP LAYER - INGREDIENT LIST

| Ingredients | A % (w/w) | B % (w/w) |
|---|---|---|
| Water | 46.75 | 42.44 |
| Double Cream | 17.94 | 18.53 |
| Akolat* (Trade Mark of Karlshamns) B15 | 13.70 | 14.15 |
| Sugar | 9.13 | 11.89 |
| Neutral Spirit | 7.85 | 8.11 |
| Whiskey | 1.17 | 1.21 |
| Starch - Thermtex | 0.91 | — |
| Tri Sodium Citrate | 0.08 | 0.08 |
| Gelatine - Sherex | 1.37 | 1.42 |
| E471 Emulsifier (Admul MG 4223)** | 0.18 | 0.19 |
| Flavour (Cocoa DA06008) | 0.91 | 1.89 |
| Whisky - nn 11034 | — | 0.09 |

*A vegetable fat, specifically, a nonlauric speciality fat based on a blend of refined and partly hydrogenated oils and fats and containing emulsifiers (E471 and E322) and natural and/or near nature identical butter fats. Akolat 15 can be used in a large number of applications in which butter fat is normally used.
**Admul MG 4223 is a mono-diglyceride prepared from edible vegetable oil and is recommended for use as a water-in-oil emulsifier in table margarine; as an aerating agent and shelf-life extender in bakery margarines and shortenings; and as an aerating agent in ice-cream and imitation creams.

Formulation B has a slightly higher alcohol content at 10.1% than Formulation A at 9.97%, in their respective base layers—this improves its organoleptic properties and, possibly, its microbial stability. In the respective top layers, sugar and flavour contents are higher in Formulation B, than in Formulation A, to improve organoleptic properties. These changes, in turn, affected the weights of the respective top layers which, then, affects the respective %(w/w).

The first liquid base phase is prepared by heating 30% of the water used to make the base to 15° C. in a jacketed insulated tank equipped with a mixer and dissolving the sugar therein.

The caramel, neutral spirit, whiskey and coffee extract flavour are then added and the solution corrected to pH 6–7 by adding 4% NaOH. When fully dissolved, 25.1% of the water used to make the base is added as ice, thereby chilling the solution to 4° C.

The second liquid base phase is prepared by using 44.9% of the water used to make the base so as to make a 7.5% (w/w) gelatine solution. The water is heated to 70° C. in a jacketed insulated vessel equipped with a stirrer and the gelatine powder is added under agitation. The solution is maintained at 70° C. for 3 minutes, in order to ensure that the gelatine is solubilised. The mixture is then cooled, with stirring to 35° C.

The base layer is then obtained by transferring two volumes of the first liquid base phase into the end mould, for example, a glass and, thereafter, dispensing one volume of the gelatine solution (second liquid base phase) into the mould in such a way as to ensure that the first and second liquid base phases are completely mixed. This is achieved using twin piston volumetric fillers, which are equipped with non-drip filling nozzles and individually jacketed hoppers (at 4° C. and at 35° C., respectively) for the first and second liquid base phases. The second liquid base phase hopper should be a low volume tank, to ensure rapid turnover and short holding times of the second liquid base phase and its filling head, down to the filling nozzle, should be trace heated to 35° C. Both filling heads/mechanisms should be attemperated by initially re-circulating the respective first and second liquid base phases. 66 mls of the first liquid base phase (at 4° C.) and 33 mls of the second liquid base phase (at 35° C.) are mixed by simultaneously filling into a 17 cl "tulip" glass with a resulting temperature, when mixed, of 16° C. approximately. Filling is through twin off-centred, non-drip filling nozzles, to ensure adequate mixing.

Extensive testing of a wide variety of glass types has demonstrated that the use of a "tulip" glass is preferred for manufacturing the product and for microwaving it prior to consumption. By "tulip" glass, is meant a glass of substantially tulip shape.

The "tulip" type glass is the most stable on the production line, it maximises the mixing of the two phases at the fillers and shows good load-bearing characteristics for foiling. On microwaving, the "tulip" glass does not develop convection currents and therefore does not display the mixing of the two layers which is characteristic of other glass shapes.

At the optimum temperature of 4° C. for the first liquid base phase and 35° C. for the second liquid base phase, the base layer sets in a period of 7–10 minutes at 10° C.–20° C. air temperature.

The 17 cl glass containing the base layer at approximately 16° C. is transferred to a covered, positively-pressured, first accumulation conveyor, whereupon it is retained for 20 minutes so as to ensure a firm set of the base layer.

The top layer is made in the following manner. Once again, the top layer is formed by providing, separately, first and second liquid top phases which are thereafter mixed.

The first liquid top phase is made by heating 60.43% of the water to make the topping to 80° C. in a jacketed insulated tank equipped with a high speed stirrer, the water being agitated vigorously. Tri-sodium citrate, emulsifier (E471), starch, sugar, Akolat (Trade Mark) B15 vegetable fat, double cream, neutral spirit, whiskey and cream liqueur flavours are then added in that order. The mixture is heated to 55° C. and, with vigorous stirring, the solution is maintained at 55° C. for 2 minutes. The solution is then double homogenised at 4,000 psi. The first liquid top phase is then cooled in-line to 13° C. and can be stored at a temperature of 13° C. in a jacketed insulating tank equipped with a stirring paddle.

The second liquid top phase is prepared by using 39.57% of the water used to make the topping so as to make a 7.5% (w/w) gelatine solution, the water being heated to 70° C. in a jacketed insulated vessel equipped with a stirrer and the gelatine powder being added under agitation. The solution is maintained at 70° C. for 3 minutes, so as to ensure that the gelatine fully solubilised. The mixture is then cooled, with stirring, as rapidly as is possible to 35° C.

The top layer is then obtained by mixing the first and second liquid phases thoroughly in a ratio of 4.0 parts by volume of first liquid top phase and 1.0 parts by volume of second liquid top phase. Specifically, twin piston volumetric fillers are used, each equipped with individually jacketed hoppers (at 13° C. and at 35° C., respectively) for the first and second liquid top phases.

The filler is equipped with a single filling and mixing head to thoroughly mix the discharges of both pistons before their deposition in the 17 cl glass which contains the set base layer. Filling volumes of 40 ml and 10 ml of first and second liquid top phases, respectively, are used, the filling being via a single centred non-drip filling nozzle.

Once again, the second liquid top phase hopper should be a low volume tank to ensure rapid turnover and short holding times of the second liquid top phase. Its filling head, down to the mixing head, should be trace heated to 35° C. As before, both filling heads/mechanisms should be attemperated by initially re-circulating their respective products. The top layer takes 8–10 minutes to set at an ambient temperature of 10°–20° C.

The 17 cl glass containing the set base layer and the 50 ml top layer is then passed to a second accumulation conveyer (covered and positively air pressurised) for a 20 minute residence time until a firm set has been achieved. The 17 cl "tulip" glass containing the set base layer and the set top layer is then transferred to a rotary foiling station where a microwavable foil is picked from a magazine, placed on the glass rim and conduction sealed at 180° C. for 0.5–1.5 seconds. The heated sealing head should be a rubber/metal composite and be fixed on flexible mountings.

The foil should be heavy gauge aluminium with no rough edges to minimise the risk of "arcing" in the microwave. The foil underseal is specifically formulated to seal to the very small cross section of the glass rim within the time/temperature allowed.

The product is then passed for packaging.

Experiments have shown that it is possible to make a cream liqueur food product with a stable cream-containing top layer with a shelf life of up to 12 weeks at room temperature i.e., less than 23° C., without using sodium caseinate to stabilise the emulsion.

The presence of 0.18% (or 0.19%) (w/w) E471, as emulsifier, in the top layer, yields a top layer with good organoleptic properties which does not form a skin after microwaving.

It will be appreciated that the temperature and residence times indicated herein are ambient temperature dependent and may be varied, depending on the actual ambient temperature experienced.

When it is desired to consume the food product, the glass containing the base layer and top layer and covered with the foil is placed in a 700 W microwave oven for 1 minute to heat the top layer to approximately 52° C. and the base layer to approximately 62° C. It will, of course, be appreciated that the microwave conditions will vary, depending on the make, age and wattage of the microwave oven.

EXAMPLE 2

A carrageenan-containing cream liqueur food product is made in the following manner.

The base layer is made first and needs to set before the top layer is applied. The base layer comprises of a coffee flavoured solution with neutral spirit, whiskey, minerals (calcium chloride dihydrate), sugar and a thermoreversible setting agent. The top layer comprises of a flavoured solution of animal and vegetable fats, neutral spirit and whiskey, emulsifiers and two thermoreversible setting agents.

Table 2 shows the ingredients for the base and top layer.

TABLE 2

BASE LAYER - INGREDIENT LIST

| Ingredients | % (w/w) |
| --- | --- |
| Water | 74.78 |
| Sugar | 15.00 |
| Deltagel 379* | 0.39 |
| Quest Caramel 15752 | 0.49 |
| Neutral Spirit | 7.64 |
| Whiskey - Bushmills | 1.13 |
| Quest Coffee 2A92529 | 0.39 |
| Calcium Chloride Dihydrate | 0.17 |

*Deltagel 379 is kappa carrageenan for use in food products and is supplied by Quest International Ireland Limited.

TOP LAYER - INGREDIENT LIST

| Ingredients | % (w/w) |
| --- | --- |
| Water | 42.78 |
| Sugar | 11.99 |
| Akolat B15* - Karlshamns | 14.27 |
| Cream | 18.69 |
| Neutral Spirit | 8.18 |
| Whiskey - Bushmills | 1.22 |
| Cocoa Flavour DA06008 | 1.90 |
| Admul MG4223 (emulsifier) (E471) | 0.19 |
| Whiskey NN11034 | 0.10 |
| Deltagel 388** | 0.30 |
| Calcium Chloride Dihydrate | 0.17 |
| Deltagel 379* | 0.20 |

*Deltagel 379 is kappa carrageenan for use in food products and is supplied by Quest International Ireland Limited.
**Deltagel P388 is iota carrageenan for use in food products and containing carrageenan (E407).

The base layer is prepared by heating 90% of the water to 100° C. in a tank equipped with a mixer and heating and cooling jackets. Calcium chloride dihydrate is added achieving a temperature of 90° C., followed by the sugar and the thermoreversible setting agent (Deltagel 379) which have been blended prior to this. Mixing is continued at 80–90° C. (15–20 mins approx.) until the solution is clear. It is then chilled to 45–50° C.—but never below this temperature range. The spirits are diluted with the remainder of the water content (10%) and are then added with colours and flavours to the tank.

The base layer is then obtained by filling a volume of the liquid base into an end mould, for example, a glass. 100 ml of the liquid base layer (at 45–50° C.) is filled into a 17 cl "tulip" glass. The filler hopper for the liquid base should be a low volume tank, to ensure rapid turnover and short holding times and its filling head, down to the filling nozzle, should be trace heated to 45–50° C. The filling head/mechanism should be attemperated by initially re-circulating the respective solution.

As in Example 1, a "tulip" glass is preferred for manufacturing the product and for microwaving it prior to consumption.

The 17 cl glass containing the base layer at approximately 40° C. is transferred to a covered, positively-pressured, first accumulation conveyor, whereupon it is retained for up to 25 minutes (air temperature 10–20° C.) so as to ensure a firm set of the base layer.

The top layer is prepared by heating 90% of the water to 100° C. in a tank equipped with a mixer and heating and cooling jackets. Calcium chloride dihydrate is added achieving a temperature of 90° C. followed by the sugar and thermoreversible setting agents which have been pre-mixed. Mixing is maintained at 80–90° C. until the solution is clear (15–20 minutes) To a small batch of the clear solution, the emulsifier (Admul), molten Akolat (fats), flavours, diluted spirit blend and cream are then added, in that order, and the solution is raised to 55° C. with heating. It is then double homogenised at 4000 psi at 55° C., cooled to 45–50° C. and then filled immediately.

The filler deposits 50 ml of the liquid (molten) top layer into the 17 cl glass which contains the set (gelled) base layer. Once again, the liquid top layer hopper should be a low volume tank to ensure rapid turnover and short holding times. Its filling head, down to the filling nozzle, should be trace heated to 45–50° C. As before, the filling head/mechanisms should be attemperated to 45–50° C. by initially re-circulating the liquid top layer.

The 17 cl glass containing the set base layer and the 50 ml top layer is then passed to a second accumulation conveyer (covered and positively air pressurised) for a 20 minute residence time until a firm set has been achieved. The top layer takes 15–25 minutes to set at an ambient temperature of 10–20° C.

The 17 cl "tulip" glass containing the set base layer and the set top layer is then transferred to a rotary foiling station where a microwavable foil is picked from a magazine, placed on the glass rim and conduction sealed at 180° C. for 0.5–1.5 seconds. The heated sealing head should be a rubber/metal composite and be fixed on flexible mountings.

As in Example 1, the foil should be heavy gauge aluminium with no rough edges to minimise the risk of "arcing" in the microwave. The foil underseal is specifically formulated to seal to the very small cross section of the glass rim within the time/temperature allowed.

Experiments have shown that it is possible to make an alcohol-containing food product with a stable cream-containing top layer with a shelf life of up to 12 weeks at temperatures up to 42° C., without using sodium caseinate to stabilise the emulsion.

The presence of 0.19% (w/w) E471, as emulsifier, in the top layer, yields a top layer with good organoleptic properties which does not form a skin after microwaving.

It will be appreciated that the temperature and residence times indicated herein are ambient temperature dependent and may be varied, depending on the actual ambient temperature experienced.

When it is desired to consume the cream liqueur food product, the glass containing the base layer and top layer and covered with the foil is placed in a 800 W microwave oven for approximately 1 minute 30 secs (half power) to heat the top and base layers to approximately 65° C. It will, of course, be appreciated that the microwave conditions will vary, depending on the make, age and wattage of the microwave oven.

It will be appreciated that, although example 1 exemplifies a food product containing gelatine as the thermoreversible setting agent and Example 2 exemplifies a food product containing carrageenan (base layer) and carrageenans (top layer) as thermoreversible setting agents, it is also within the scope of the present invention to use gelatine (or other thermoreversible setting agent(s)) in one layer and carrageenan(s) (or other thermoreversible setting agent(s)) in another layer.

What is claimed is:

1. A beverage food product for consumption at a temperature elevated above room temperature, the beverage food product comprising a top layer including less than 70% (w/w) water and an amount of at least one top thermoreversible setting agent sufficient to maintain the top layer in a gel phase at room temperature, said amount of said at least one top thermoreversible setting agent permitting thermoreversion of said top layer to a liquid phase at said temperature elevated above room temperature; and a base layer including at least one base thermoreversible setting agent in an amount sufficient to maintain the base layer in a gel phase at room temperature, said amount of said at least one base thermoreversible setting agent permitting thermoreversion of said base layer to a liquid phase at said temperature elevated above room temperature, wherein sodium caseinate is substantially absent from the top layer.

2. A beverage food product according to claim 1, in which the top layer additionally comprises more than 15% (w/w) fat and at least one top emulsifier.

3. A beverage food product according to claim 2, in which the top thermoreversible setting agent is selected from the group consisting of gelatine, agar, gellan gum, methyl celluloses, guar gum, at least one carrageenan, gum arabic, xanthan gum, locust bean gum and mixtures thereof; and the top emulsifier is selected from the group consisting of mono-glycerides, di-glycerides, sucrose esters; and mixtures thereof.

4. A beverage food product according to claim 3, in which the top layer contains 0.1 to 1.75% (w/w) of the at least one top thermoreversible setting agent or mixtures thereof.

5. A beverage food product according to claim 1, in which said base layer contains 0.1 to 3.5% (w/w) of said at least one base thermoreversible setting agent, the base thermoreversible setting agent being selected from the group consisting of gelatine, agar, gellan gum, methyl celluloses, guar gum, at least one carrageenan, gum arabic, xanthan gum, locust bean gum and mixtures thereto.

6. A beverage food product according to claim 1, in which the top layer contains 40–65% (w/w) water.

7. A beverage food product according to claim 1, in which the top layer contains 20–40% (w/w) fat.

8. A beverage food product according to claim 5, in which the base layer contains at least one comestibly suitable alcohol.

9. A beverage food product according to claim 1, in which the top layer contains at least one comestibly suitable alcohol.

10. A beverage food product according to claim 8, in the form of a cream liqueur.

11. A cream liqueur food product for consumption at a temperature elevated above room temperature, the cream liqueur food product comprising:

a top layer having
(i) less than 70% (w/w) water,
(ii) more than 15% (w/w) fat;
(iii) at least one top emulsifier; and
(iv) at least one top thermoreversible setting agent,
the at least one top emulsifier and the at least one top thermoreversible setting agent being in an amount sufficient to maintain the top layer in a gel phase at room temperature, said amount of said at least one top emulsifier and said at least one top thermoreversible setting agent permitting thermoreversion of said top layer to a liquid phase at said temperature elevated above room temperature; and a base layer including at least one base thermoreversible setting agent in an amount sufficient to maintain the base layer in a gel phase at room temperature, said amount of said at least one base thermoreversible setting agent permitting thermoreversion of said base layer to a liquid phase at said temperature elevated above room temperature, wherein the, or each, top emulsifier or top thermoreversible setting agent is not sodium caseinate.

12. A beverage food product according to claim 3, in which the top layer contains 0.1 to 1.75% (w/w) of the least one thermoreversible setting agent selected from the group consisting of gelatine, kappa-carrageenan, iota-carrageenan, mixtures of kappa and iota-carrageenan; and mixtures of one or both of kappa and iota-carrageenan with gelatine.

13. A beverage food product according to claim 1, in which said base layer contains 0.1 to 3.5% (w/w) of said at least one base thermoreversible setting agent, the base thermoreversible setting agent being selected from the group consisting of gelatine, carrageenan and mixtures thereof.

14. A beverage food product according to claim 1, in which said base layer contains 0.1 to 3.5% (w/w) of said at least one base thermoreversible setting agent, the base thermoreversible setting agent being selected from the group consisting of gelatine, kappa-carrageenan, iota-carrageenan, mixtures of kappa and iota-carrageenan and mixtures of one or both of kappa and iota-carrageenan with gelatine.

15. A beverage food product according to claim 1, in which the top layer contains 40–50% (w/w) water.

16. A beverage food product according to claim 2, in which the top layer contains 40–50% (w/w) water.

17. A beverage food product according to claim 4, in which the top layer contains 20–40% (w/w) fat.

18. A beverage food product according to claim 2, in which the top layer contains at least one comestibly suitable alcohol.

19. A beverage food product according to claim 4, in which the top layer contains at least one comestibly suitable alcohol.

20. A beverage food product according to claim 9, in the form of a cream liqueur.

* * * * *